July 30, 1935.  C. PFANSTIEHL  2,009,903
SELF STARTING ARC
Original Filed Jan. 13, 1934  2 Sheets-Sheet 2
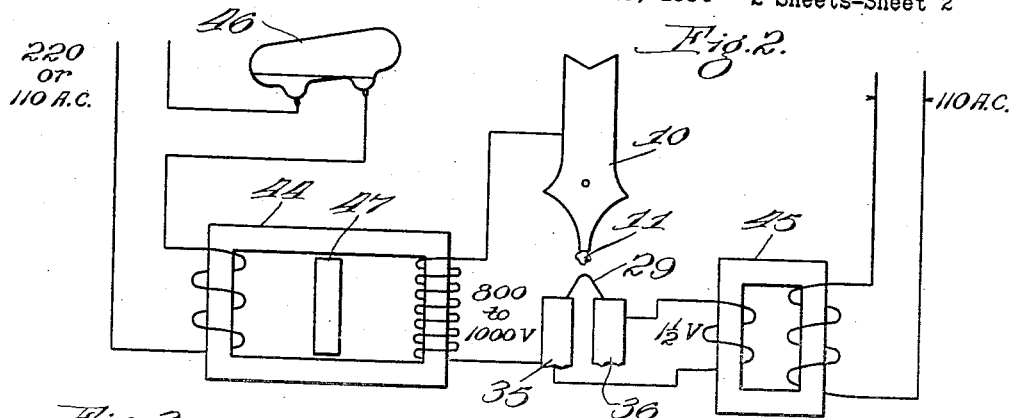
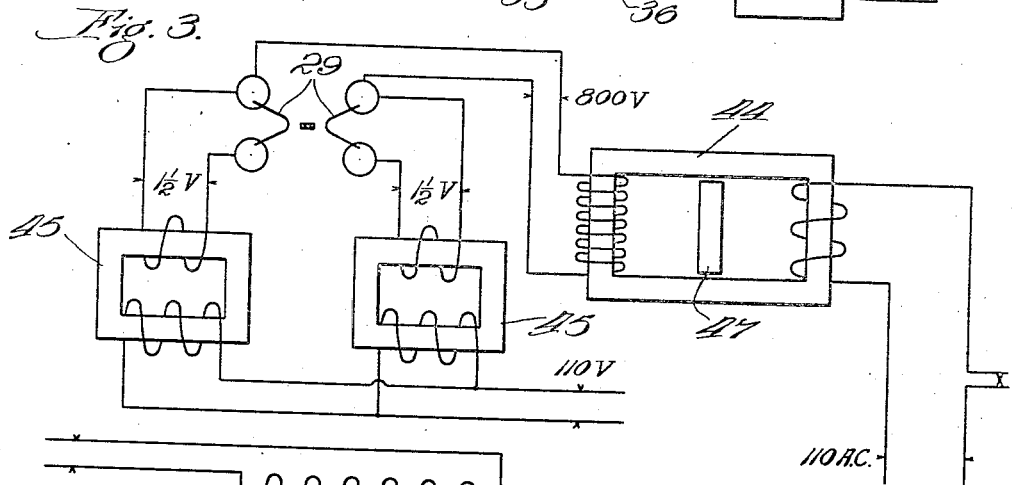
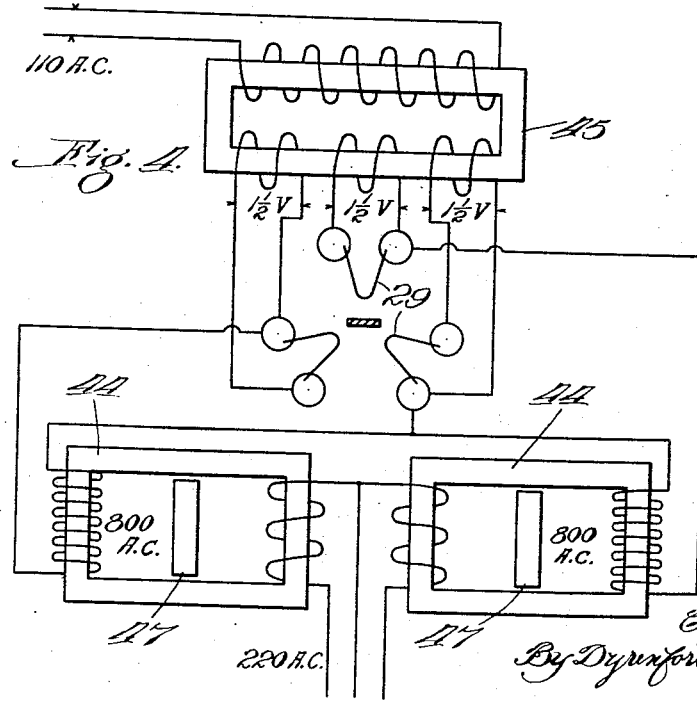

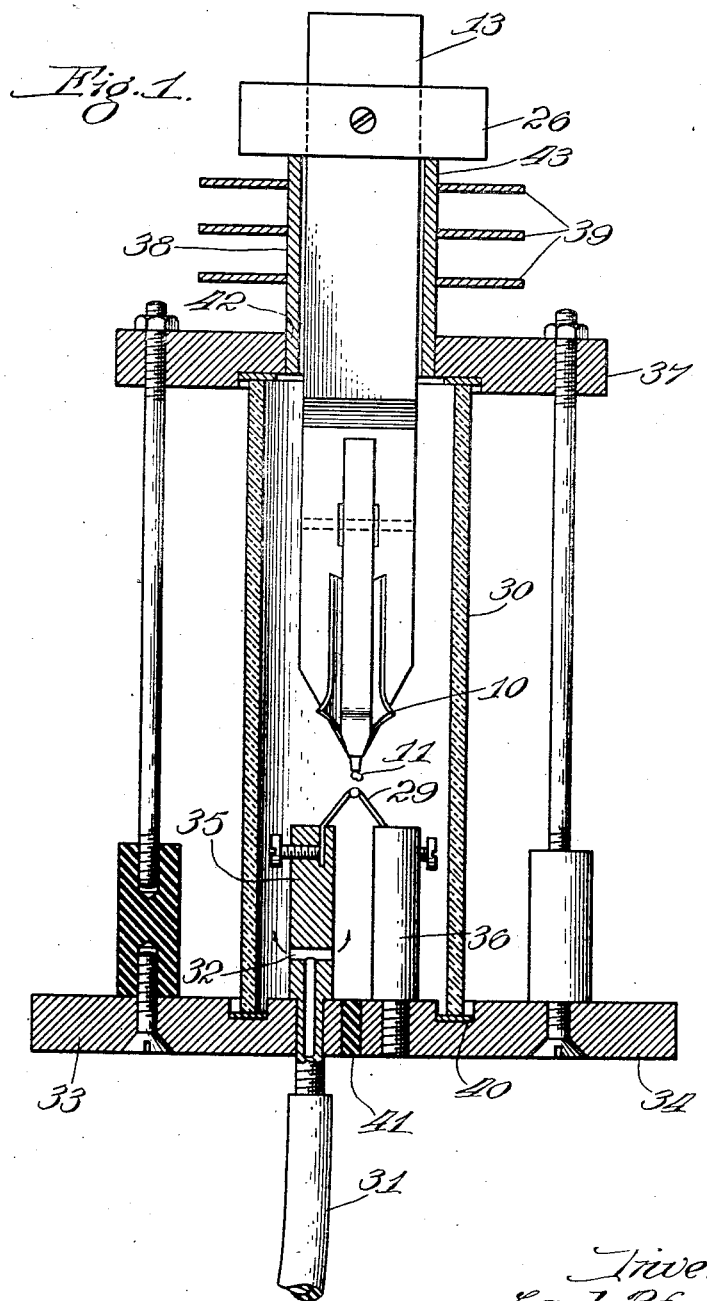

Patented July 30, 1935

2,009,903

UNITED STATES PATENT OFFICE 2,009,903

SELF-STARTING ARC

Carl Pfanstiehl, Highland Park, Ill., assignor to Pfanstiehl Chemical Co., a corporation of Illinois Original application January 13, 1934, Serial No. 706,565. Divided and this application October 27, 1934, Serial No. 750,362

3 Claims. (Cl. 219—10)

This invention relates to a self-starting arc.

As set forth in my co-pending application Serial No. 706,565, filed January 13, 1934, of which this application is a division, it is very desirable for many purposes to have an electric arc which will start with the electrodes in their operating position under substantially the same voltage required to maintain it. For example, in the welding of pen-points to pen-nibs, it is desirable to start the arc each time a new pen-nib is inserted, particularly where the nib is part of the arc circuit. It is also preferred to start the arc each time, however, even where the pen-nib is not part of the arc circuit.

The invention is illustrated in the drawings in which Figure 1 is a broken sectional elevation of a welding apparatus; Figure 2 illustrates a diagrammatic wiring circuit of the apparatus shown in Figure 1; Figure 3 is an optional wiring diagram in which two tungsten filaments are used; and Figure 4 shows a three-phase wiring diagram using three tungsten filaments, each operating on a different phase.

The invention is illustrated in connection with a specific use of the arc for the welding of tips on pens, which is more completely described in my co-pending application Serial No. 706,565. The tungsten filament 29 is centrally located near the bottom of a Pyrex glass inclosed chamber 30 set in rubber gaskets 40. A hose 31 having outlets 32 is provided below the filament for the admission of a gentle stream of hydrogen or other readily ionizable gas. Hydrogen is preferred because of its tendency to prevent the formation of a metallic arc, and because it provides a reducing atmosphere.

The base of chamber 30 is divided by insulation 41 into portions 33 and 34. The filament 29 is held in copper terminals 35 and 36, which are electrically connected to the welding circuit as indicated in Figure 2. A copper cover 37 is provided at the top of chamber 30, and is supplied with a central aperture 42 for the nib and holder to pass through. This opening is preferably substantially closed by the holder, but sufficient space is left for the gas to escape. Rising from the cover 37 is the neck 38, provided with copper cooling fins 39. Other cooling means may of course be substituted, for example, water-cooling means. The collar 26 of the holder 13 seats itself upon the shoulders 43 of the neck 38, and thereby establishes the proper distance between the tip 11 of the pen-point 10, and the filament 29.

As shown in Figure 2, the arc circuit comprises a 220 or 110 volt A. C. supply which is stepped up by the highly reactive transformer 44 to 800 to 1000 volts. The tungsten filament 29 is continuously heated by a high amperage, low voltage current, for example, 30 amperes, and 1½ volts from the step down transformer 45 which may be connected to an ordinary 110 volt A. C. supply. The operation of the arc is controlled by the mercury timing switch 46 which may be set to cause an arc of any desired duration. With the hot tungsten filament and an ionized atmosphere of hydrogen and a gap of about ⅛ inch between the hot filament and the cold pellet, a time of the order of 1 to 2 seconds is satisfactory for fusing the pellet to the nib. The hot filament ionizes the hydrogen, and thereby greatly lowers the resistance of the gap so that only 800 to 1000 volts is necessary to start the arc, whereas many times this voltage would be required in an unionized atmosphere. It is therefore possible to start the arc on substantially the same voltage which is required to maintain it. A magnetic shunt 47 however is provided in the transformer 44 to prevent any sudden excess of current upon the establishment of the arc.

The establishment of the arc, of course, reduces the resistance across the arc considerably, so that the voltage may be dropped as low as say 300 to 400 volts, or possibly even lower, but this difference is insignificant compared to the difference which would be encountered in a normal atmosphere.

In using the arc circuit, the tungsten filament current is started so that the filament is hot, and a stream of hydrogen is passed gently through the chamber 30, ionizing as it passes the filament 29. The stream should be sufficiently slow so that the atmosphere in the chamber is substantially quiescent. The holder 13 is then placed in the welding apparatus and the timing switch started.

In Figure 3 a different type of arc is shown in which the arc is produced across two filaments 29 instead of between one filament and a removable object. With this type of apparatus, the filaments may be arranged about $\tfrac{3}{16}$ to ¼ of an inch apart.

In Figure 4, a three-phase arrangement is shown with two transformers 44 with shunts 47, and the arc is provided between the three filaments, each operating upon a different phase and each highly insulated from the others. This method produces a little hotter and larger arc. The pen-nib should be held in the center and slightly above the points of the three filaments.

The quiescent ionized hydrogen atmosphere is not only of great value in starting the arc while the electrodes are in their operating position, but permits the maintenance of a wide gap arc upon a relatively low amperage. For example, a gap of ⅛ inch may be operated on .1 to .7 ampere, the operating voltage varying from say 800–300 volts.

It is preferred to maintain the heating current on one or more of the filaments, particularly at lower currents, after the arc has been started.

While an A. C. arc has been specified in the welding operation, the invention is applicable to other forms of arcs as well, including D. C. arcs.

Other ionizing means, such as low temperature coated filaments such as are used in radio tubes may be employed, but where the filament is also an electrode of the arc, it is preferred to use tungsten. Where tungsten is employed it is preferred to heat it white hot.

The foregoing detailed description is given for clearness of understanding only, and no unnecessary limitations should be understood therefrom, but the appended claims should be construed as broadly as permissible in view of the prior art.

What I regard as new and desire to secure by Letters Patent is:

1. In the welding of a metallic object in an electric arc having separated electrodes, the steps of maintaining a hydrogen atmosphere about the electrodes and the object, heating the hydrogen about the electrodes to ionize it, initiating the arc in the ionized hydrogen, and welding the object in hydrogen.

2. The method as set forth in claim 1 in which hydrogen about the object is ionized.

3. The method as set forth in claim 1 in which the hydrogen atmosphere is substantially quiescent.

CARL PFANSTIEHL.